United States Patent Office.

WILLIAM M. TANDY, OF CARROLLTON, KENTUCKY.

Letters Patent No. 108,845, dated November 1, 1870.

IMPROVEMENT IN COMPOUNDS FOR CLEANSING AND PRESERVING THE TEETH AND GUMS.

The Schedule referred to in these Letters Patent and making part of the same.

Be it known that I, WILLIAM M. TANDY, of the town of Carrollton, in the county of Carroll and State of Kentucky, have invented a new and useful Preparation or Compound for cleansing and preserving teeth, healing diseased gums, tightening loose teeth, preventing toothache, removing canker, and restoring vitiated breath and taste; and I do hereby declare that the following is a full, clear, and exact description of the same.

The nature of my invention consists in mixing two parts gum myrrh, two parts gum kino, one part acacia catechu, and one part of hydrastis, which I call "Acos," which, when applied to the teeth and gums with a brush, cleanses and preserves teeth, heals diseased gums, causing them to adhere to the teeth, thereby tightening loose teeth, preventing toothache, removes canker, and restores vitiated breath and taste.

I do not claim the discovery or preparation of any of the specified ingredients in their simple state.

I claim as my invention—

The mixing or compounding of said ingredients, and manufacture of the compound which I denominate "Acos," in the proportions and for the purposes set forth.

WILLIAM M. TANDY.

Witnesses:
   W. F. TANDY,
   J. W. TANDY.